(12) United States Patent
Gadkaree et al.

(10) Patent No.: US 8,124,213 B2
(45) Date of Patent: Feb. 28, 2012

(54) FLOW-THROUGH SORBENT COMPRISING A METAL SULFIDE

(75) Inventors: Kishor Purushottam Gadkaree, Big Flats, NY (US); Anbo Liu, Painted Post, NY (US); Joseph Frank Mach, Lindley, NY (US)

(73) Assignee: Corning Incorporated, Corning, NY (US)

( * ) Notice: Subject to any disclaimer, the term of this patent is extended or adjusted under 35 U.S.C. 154(b) by 120 days.

(21) Appl. No.: 12/129,798

(22) Filed: May 30, 2008

(65) Prior Publication Data

US 2009/0297762 A1    Dec. 3, 2009

(51) Int. Cl.
*B32B 3/12* (2006.01)
*C04B 35/00* (2006.01)

(52) U.S. Cl. ........................................ 428/116; 501/140

(58) Field of Classification Search ........................ None
See application file for complete search history.

(56) References Cited

U.S. PATENT DOCUMENTS

| | | | |
|---|---|---|---|
| 4,094,777 A * | 6/1978 | Sugier et al. ................... 210/670 |
| 4,305,827 A | 12/1981 | Sasaki |
| 4,338,288 A | 7/1982 | Rollmann |
| 4,474,896 A | 10/1984 | Chao .................................. 27/2 |
| 4,482,641 A | 11/1984 | Wennerberg |
| 4,500,327 A | 2/1985 | Nishino et al. |
| 4,656,153 A | 4/1987 | Wennerberg |
| 4,708,853 A | 11/1987 | Matviya et al. |
| 4,758,272 A | 7/1988 | Pierotti et al. |
| 4,814,152 A * | 3/1989 | Yan ................................. 423/210 |
| 4,831,003 A | 5/1989 | Lang et al. |
| 4,970,189 A | 11/1990 | Tachibana |
| 4,992,233 A | 2/1991 | Swaroop et al. |
| 5,245,106 A | 9/1993 | Cameron et al. |
| 5,278,123 A | 1/1994 | Chopin et al. ...................... 21/6 |
| 5,288,306 A | 2/1994 | Aibe et al. |
| 5,350,728 A | 9/1994 | Cameron et al. |
| 5,488,023 A | 1/1996 | Gadkaree et al. ............. 502/182 |
| 5,601,701 A | 2/1997 | Cameron et al. |
| 5,750,026 A | 5/1998 | Gadkaree et al. .................. 1/28 |
| 5,914,294 A | 6/1999 | Park et al. |
| 5,998,328 A | 12/1999 | Dawes et al. ................... 502/182 |
| 6,103,205 A | 8/2000 | Wojtowicz et al. |
| 6,136,749 A | 10/2000 | Gadkaree et al. ............. 502/183 |
| 6,187,713 B1 | 2/2001 | Gadkaree ....................... 502/425 |
| 6,258,334 B1 | 7/2001 | Gadkaree et al. ................. 53/46 |
| 6,472,343 B1 | 10/2002 | McCrae et al. |
| 6,573,212 B2 | 6/2003 | McCrae et al. |
| 6,696,384 B2 | 2/2004 | McCrae et al. |
| 6,719,828 B1 * | 4/2004 | Lovell et al. .................... 95/134 |
| 6,914,034 B2 | 7/2005 | Vo |
| 7,160,366 B2 | 1/2007 | Blackburn et al. |
| 7,250,387 B2 | 7/2007 | Durante et al. |
| 7,288,499 B1 | 10/2007 | Lovell et al. |
| 2003/0075484 A1 | 4/2003 | Sakai et al. |
| 2004/0074391 A1 | 4/2004 | Durante et al. |
| 2005/0059549 A1 | 3/2005 | Vo |
| 2005/0079975 A1 * | 4/2005 | Fujita ............................. 502/439 |
| 2005/0093189 A1 | 5/2005 | Vo |
| 2005/0100699 A1 | 5/2005 | Durante et al. |
| 2005/0150835 A1 | 7/2005 | Vo |
| 2005/0152821 A1 | 7/2005 | Durante et al. |
| 2005/0155934 A1 | 7/2005 | Vo et al. |
| 2005/0247635 A1 | 11/2005 | Vo et al. |
| 2006/0045829 A1 | 3/2006 | Dodwell et al. |
| 2006/0048646 A1 | 3/2006 | Olson et al. |
| 2006/0051270 A1 | 3/2006 | Brunette |
| 2006/0116287 A1 | 6/2006 | Durante et al. |
| 2006/0205592 A1 | 9/2006 | Chao et al. |
| 2006/0229476 A1 | 10/2006 | Mitchell, Sr. et al. .............. 31/8 |
| 2007/0092418 A1 | 4/2007 | Mauldin et al. |
| 2007/0104631 A1 | 5/2007 | Durante et al. |
| 2007/0160517 A1 | 7/2007 | Fan et al. |
| 2007/0179056 A1 | 8/2007 | Baek et al. |
| 2007/0232488 A1 | 10/2007 | Akiyama et al. |
| 2007/0292328 A1 | 12/2007 | Yang et al. |
| 2008/0132408 A1 | 6/2008 | Mitchell et al. |

FOREIGN PATENT DOCUMENTS

| | | | |
|---|---|---|---|
| EP | 0 153 911 | 9/1985 | |
| EP | 0487370 B1 | 5/1992 | |
| EP | 0 488 716 | 6/1992 | |
| GB | 1 533 059 | 11/1978 | ........................ 53/16 |
| GB | 2 428 598 | 2/2007 | ........................ 53/14 |
| WO | 2005061099 A1 | 7/2005 | |
| WO | 2007114849 A2 | 10/2007 | |
| WO | 2007/133487 | 11/2007 | |
| WO | 2007127652 A2 | 11/2007 | |
| WO | 2008/020250 | 2/2008 | |
| WO | 2009/101429 | 8/2009 | |

OTHER PUBLICATIONS

International Search Report for Application No. PCT/US2009/003113 dated Sep. 25, 2009.

* cited by examiner

*Primary Examiner* — Gordon R Baldwin
(74) *Attorney, Agent, or Firm* — Jason A. Barron; Joseph M. Homa

(57) ABSTRACT

A flow-through sorbent comprising at least 30 wt % of a metal sulfide, and a binder. The sorbent may be used, for example, for the removal of a contaminant, such as mercury, from a fluid stream.

9 Claims, No Drawings

FLOW-THROUGH SORBENT COMPRISING A METAL SULFIDE

FIELD OF THE DISCLOSURE

This disclosure relates to certain flow-through sorbents comprising a metal sulfide. The sorbents may be used, for example, for the removal of a contaminant, such as mercury, from a fluid stream.

BACKGROUND

Hazardous contaminant emissions have become environmental issues of increasing concern because of the dangers posed to human health. For instance, coal-fired power plants and medical waste incineration are major sources of human activity related mercury emission into the atmosphere.

It is estimated that there are 48 tons of mercury emitted from coal-fired power plants in the United States annually. One DOE-Energy Information Administration annual energy outlook projected that coal consumption for electricity generation will increase from 976 million tons in 2002 to 1,477 million tons in 2025 as the utilization of coal-fired generation capacity increases. However, mercury emission control regulations have not been rigorously enforced for coal-fired power plants. A major reason is a lack of effective control technologies available at a reasonable cost, especially for elemental mercury control.

A technology currently in use for controlling elemental mercury as well as oxidized mercury is activated carbon injection (ACI). The ACI process involves injecting activated carbon powder into a flue gas stream and using a fabric filter or electrostatic precipitator to collect the activated carbon powder that has sorbed mercury. ACI technologies generally require a high C:Hg ratio to achieve the desired mercury removal level (>90%), which results in a high portion cost for sorbent material. The high C:Hg ratio indicates that ACI does not utilize the mercury sorption capacity of carbon powder efficiently.

An activated carbon packed bed can reach high mercury removal levels with more effective utilization of sorbent material. However, a typical powder or pellet packed bed has a very high pressure drop, which significantly reduces energy efficiency. Further, these fixed beds are generally an interruptive technology because they require frequent replacement of the sorbent material depending on the sorption capacity.

Activated carbon honeycombs disclosed in US 2007/0261557 may be utilized to achieve high removal levels of contaminants such as toxic metals. The inventors have now discovered new materials for flow-through sorbents, such as honeycombs, which are described herein.

DESCRIPTION OF EMBODIMENTS

One embodiment of the invention is a flow-through sorbent comprising:
  at least 30 wt % of a metal sulfide; and
  a binder.

Exemplary flow-through sorbents include, for example, any structure comprising channels, porous networks, or any other passages that would permit the flow of a fluid stream through the sorbent. For instance, the flow-through sorbent may be a monolith or an arrangement of interconnected structures through which a fluid steam may pass. The flow-through sorbent may be a honeycomb sorbent comprising an inlet end, an outlet end, and a multiplicity of cells extending from the inlet end to the outlet end, the cells being defined by intersecting porous cell walls. The honeycomb sorbent could optionally comprise one or more selectively plugged honeycomb cell ends to provide a wall flow-through structure that allows for more intimate contact between a fluid stream and cell walls.

The flow-through sorbents comprise at least 30 wt % of a metal sulfide. For example, the flow-through sorbents may comprise at least 35 wt %, at least 40 wt %, at least 45 wt %, at least 50 wt %, at least 55 wt %, at least 60 wt %, at least 65 wt %, at least 70 wt %, at least 75 wt %, or at least 80 wt % of a metal sulfide. The wt % of a metal sulfide is calculated on the basis of the total weight of the sorbent body, and may be determined using any suitable analytical technique, such as mass spectroscopy.

Exemplary metal sulfides include sulfides of manganese, copper, palladium, molybdenum, or tungsten, and combinations thereof. The metal element in the metal sulfide, however, is not limited to those examples. For example, the metal element in the metal sulfides may be selected from alkali metals, alkaline earth metals, transition metals, rare earth metals (including lanthanoids), and other metals such as aluminum, gallium, indium, tin, lead, thallium and bismuth. The weight percent of metal sulfides includes the weight percent of all metal sulfides in the sorbent.

The binder may be an inorganic binder, an organic binder, or a combination of both an inorganic binder and an organic binder. The binder can provide mechanical integrity to the sorbent by fusing to the metal sulfide or to other binder material and/or by forming a matrix throughout which the metal sulfide may be dispersed.

Exemplary inorganic binders include oxides, sulfates, carbonates, and phosphates, such as oxides, sulfates, carbonates, and phosphates of metals or of semi-metals such as silicon and germanium. For instance, talc, clay such as bentonite clay, and Plaster of Paris may be used as inorganic binders. In some embodiments, the flow-through sorbent comprises up to 70%, 60%, 50%, 40%, 30%, 20%, or 10% by weight of an inorganic binder, such as an oxide, sulfate or carbonate or combinations thereof.

The flow-through sorbents of the invention may comprise organic binders. For purposes of this invention, the term "organic binder" includes not only organic compounds but also the carbon remnants of such compounds If they have been carbonized or calcined by exposure to carbonization or calcination conditions such as a high temperature. Thus, reference to a particular material as an "organic binder" includes that material as well as the carbonized or calcined remnants of such a material. In some embodiments, the flow-through sorbent comprises up to 70%, 60%, 50%, 40%, 30%, 20%, or 10% by weight of an organic binder, or up to 70%, 60%, 50%, 40%, 30%, 20%, or 10% by weight of a combination of an organic binder and inorganic binder.

Exemplary organic binders include cellulose compounds. Cellulose compounds include cellulose ethers, such as methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. An example methylcellulose binder is METHOCEL A, sold by the Dow Chemical Company. Example hydroxypropyl methylcellulose binders include METHOCEL E, F, J, K, also sold by the Dow Chemical Company. Binders in the METHCEL 310 Series, also sold by the Dow Chemical Company, can also be used in the context of the invention. METHOCEL A4M is an example binder for use with a RAM extruder. METHO-CEL F240C is an example binder for use with a twin screw extruder.

Exemplary organic binders also include organic resins. Organic resins include thermosetting resins and thermoplastic resins (e.g., polyvinylidene chloride, polyvinyl chloride, polyvinyl alcohol, and the like). Synthetic polymeric material may be used, such as phenolic resins or a furfural alcohol based resin such as furan resins. Exemplary suitable phenolic resins are resole resin such as plyophen resin. An exemplary suitable furan liquid resin is Furcab-LP from QO Chemicals Inc., IN, U.S.A. An exemplary solid resin is solid phenolic resin or novolak. Any organic resin binder may be uncured, cured, or carbonized in the flow-through sorbent of the invention.

The flow-through sorbents may comprise any other suitable materials in addition to the metal sulfide and binder. For instance, the sorbents may comprise sulfur in addition to that present in the metal sulfide. The additional sulfur may include sulfur at any oxidation state, including elemental sulfur (0), sulfate (+6), and sulfite (+4). The term sulfur thus includes elemental sulfur or sulfur present in a chemical compound or moiety.

The flow-through sorbents may be made by any suitable technique. In one embodiment, the sorbents may made by a method that comprises:
providing a mixture comprising
   a metal sulfide, or a combination of 1) a metal oxide or metal sulfide with 2) an additional sulfur source, and
   an inorganic binder;
forming the mixture into the shape of a flow-through structure, such as by extrusion; and
drying and optionally additionally firing the shaped structure.

The metal sulfide and inorganic binder may be any metal sulfide or inorganic binder discussed above. In embodiments where a metal oxide is provided in the mixture with an additional sulfur source, the two may react to form the metal sulfide when exposed to high temperatures such as firing temperatures. Exemplary metals in the metal oxides include any metals mentioned above that may form the metal sulfides. Unreacted metal oxides may remain as an inorganic binder.

The additional sulfur source may be any source of sulfur in elemental or oxidized state. This includes sulfur powder, sulfur-containing powdered resin, sulfides, sulfates, and other sulfur-containing compounds, and mixtures or combination of any two or more of these. Exemplary sulfur-containing compounds include hydrogen sulfide and/or its salts, carbon disulfide, sulfur dioxide, thiophene, sulfur anhydride, sulfur halides, sulfuric ester, sulfurous acid, sulfacid, sulfatol, sulfamic acid, sulfan, sulfanes, sulfuric acid and its salts, sulfite, sulfoacid, sulfobenzide, and mixtures thereof.

The shaped structure can be dried, for example, in an environment at 75-200° C. The shaped structure can also be fired to impart greater mechanical integrity to the structure, such as adhesion of the inorganic binder to the metal sulfide or other binder material through sintering and/or formation of a matrix throughout which the metal sulfide is dispersed. The firing conditions may also calcine or carbonize any organic binder, such as cellulose compounds, that may be present in the structure.

Exemplary firing conditions include firing at 900° C. to 1500° C. for a period of from 0.5 to 10 hours in a controlled gas environment at a heating rate of, for example, 0.5-2° C./min. In another embodiment, the firing process can be executed for 20-45 hours at 1100-1300° C. in air or in a mixture of nitrogen and oxygen. In yet another embodiment, the structure may be heated to calcinate any organic binder, for example at a temperature of 600° C. or more, then fired at a higher temperature to achieve sintering of the inorganic binder material.

Another technique for making a flow-through sorbent includes a method that comprises:
providing a mixture comprising
   a metal sulfide,
   optionally an additional sulfur source, and
   a curable organic binder such as an organic resin;
forming the mixture into the shape of a flow-through structure, such as by extrusion; and
drying and optionally curing the shaped structure.

The characteristics of the metal sulfide, additional sulfur source, and curable organic binder have been discussed previously. Curing can be performed, for example, in air at atmospheric pressure and typically by heating the structure at a temperature of from 70° C. to 200° C. for about 0.5 to about 5.0 hours. In certain embodiments, the structure is heated from a low temperature to a higher temperature in stages, for example, from 70° C., to 90° C., to 125° C., to 150° C., each temperature being held for a period of time. Additionally, curing can also be accomplished by adding a curing additive such as an acid additive at room temperature.

The mixtures in either of the methods mentioned above may also optionally comprise forming aids. Exemplary forming aids include soaps, fatty acids, such as oleic, linoleic acid, sodium stearate, etc., polyoxyethylene stearate, etc. and combinations thereof. Other additives that can be useful for improving the extrusion and curing characteristics of the batch are phosphoric acid and oil. Exemplary oils include petroleum oils with molecular weights from about 250 to 1000, containing paraffinic and/or aromatic and/or alicyclic compounds. Some useful oils are 3 in 1 oil from 3M Co., or 3 in 1 household oil from Reckitt and Coleman Inc., Wayne, N.J. Other useful oils can include synthetic oils based on poly(alpha olefins), esters, polyalkylene glycols, polybutenes, silicones, polyphenyl ether, CTFE oils, and other commercially available oils. Vegetable oils such as sunflower oil, sesame oil, peanut oil, soybean oil etc. are also useful.

The flow-through sorbents may be used in the context of the sorption of any contaminant from a fluid. For example, a fluid may be passed through the flow-through sorbent such as a honeycomb monolith discussed above. The fluid may be in the form of a gas or a liquid. The gas or liquid may also contain another phase, such as a solid particulate in either a gas or liquid stream, or droplets of liquid in a gas stream. Example gas streams include coal combustion flue gases (such as from bituminous and sub-bituminous coal types or lignite coal) and syngas streams produced in a coal gasification process.

The terms "sorb," "sorption," and "sorbed," refer to the adsorption, absorption, or other entrapment of the contaminant on the sorbent, either physically, chemically, or both physically and chemically.

Contaminants to be sorbed include, for instance, contaminants at 3 wt % or less within the fluid stream, for example at 2 wt % or less, or 1 wt % or less. Contaminants may also include, for instance, contaminants at 10,000 μg/m$^3$ or less within the fluid stream. Example contaminants include metals, including toxic metals. The term "metal" and any reference to a particular metal or other contaminant by name herein includes the elemental forms as well as oxidation states of the metal or other contaminant. Sorption of a metal or other named contaminant thus includes sorption of the elemental form of the metal or other contaminant as well as sorption of any organic or inorganic compound or composition comprising the metal or other contaminant.

Example metals that can be sorbed include cadmium, mercury, chromium, lead, barium, beryllium, and chemical compounds or compositions comprising those elements. In one embodiment, the metal is mercury in an elemental ($Hg^°$) or oxidized state ($Hg^+$ or $Hg^{2+}$). Example forms of oxidized mercury include HgO and halogenated mercury, for example $Hg_2Cl_2$ and $HgCl_2$. Other exemplary metallic contaminants include nickel, cobalt, vanadium, zinc, copper, manganese, antimony, silver, and thallium, as well as organic or inorganic compounds or compositions comprising them. Additional contaminants include arsenic and selenium as elements and in any oxidation states, including organic or inorganic compounds or compositions comprising arsenic or selenium.

The contaminant may be in any phase that can be sorbed on the flow-through sorbents. Thus, the contaminant may be present, for example, as a liquid in a gas fluid steam, or as a liquid in a liquid fluid stream. The contaminant could alternatively be present as a gas phase contaminant in a gas or liquid fluid stream. In one embodiment, the contaminant is mercury vapor in a coal combustion flue gas or syngas stream.

The invention is further described with reference to the following non-limiting examples.

EXAMPLE 1

Manganese dioxide 61.5 wt %, Talc 21.5 wt %, Sulfur 9.1 wt %, methylcellulose 6.9 wt % and sodium stearate 1 wt % as lubricant were mixed with water and mulled to obtain an extrudable batch. The batch was extruded through a 100 cpsi die with 17 mil wall thickness. Excellent quality extrusions were obtained. The extruded samples were then fired in 1) air and 2) nitrogen at 900-1000° C. to obtain good quality honeycombs.

EXAMPLE 2

Manganese sulfide 61.5 wt %, Talc 23%, methylcellulose binder 7 wt %, and sodium stearate 1 wt % were mixed with water in a muller to form an extrudable paste. The paste was then extruded through a 100 cpsi die to create a manganese sulfide honeycomb structure with an inorganic binder and an organic binder. An excellent extruded structure was obtained as in Example 1.

EXAMPLE 3

The experiment of Example 2 was repeated with copper sulfide instead of manganese sulfide to obtain a good extruded structure.

EXAMPLE 4

The experiment of Example 1 was repeated except instead of talc a phenolic resin binder was added. After extrusion the honeycombs dried and cured rather than fired.

It should be understood that while the invention has been described in detail with respect to certain illustrative embodiments thereof, it should not be considered limited to such, as numerous modifications are possible without departing from the broad spirit and scope of the invention as defined in the appended claims.

We claim:

1. A honeycomb flow-through sorbent comprising an inlet end, an outlet end, and a multiplicity of cells extending from the inlet end to the outlet end, the cells being defined by intersecting porous cell walls, wherein the inlet end and the outlet end are not plugged, wherein the honeycomb flow through sorbent comprises a composition comprising:
   at least 30 wt % of a metal sulfide;
   elemental sulfur; and
   a binder matrix comprising an organic binder, wherein the metal sulfide and the elemental sulfur are dispersed within the binder matrix.

2. The flow-through sorbent according to claim 1, wherein the metal sulfide is a sulfide of manganese, copper, palladium, molybdenum, or tungsten.

3. The flow-through sorbent according to claim 1, wherein the binder is an inorganic binder.

4. The flow-through sorbent according to claim 3, wherein the inorganic binder comprises an oxide, sulfate, carbonate, or phosphate.

5. The flow-through sorbent according to claim 4, wherein the inorganic binder comprises an oxide, sulfate, carbonate, or phosphate of a metal.

6. The flow-through sorbent according to claim 5, wherein the inorganic binder comprises talc or clay.

7. The flow-through sorbent according to claim 1, wherein the organic binder comprises a cellulose compound or an organic resin.

8. The flow-through sorbent according to claim 7, wherein the organic binder comprises methylcellulose or a cured phenolic resin.

9. The flow-through sorbent according to claim 1, which comprises an inorganic binder.

* * * * *